United States Patent [19]

Hasegawa et al.

[11] Patent Number: 4,691,114
[45] Date of Patent: Sep. 1, 1987

[54] ORIGINAL READER WITH VARIABLE MAGNIFICATION AND TIME DELAY

[75] Inventors: Shizuo Hasegawa; Kimiyoshi Hayashi, both of Tokyo, Japan

[73] Assignee: Canon Kabushiki Kaisha, Tokyo, Japan

[21] Appl. No.: 704,920

[22] Filed: Feb. 25, 1985

[30] Foreign Application Priority Data

Feb. 29, 1984 [JP] Japan .................. 59-38332
Feb. 29, 1984 [JP] Japan .................. 59-38333

[51] Int. Cl.$^4$ ............................................. H01J 40/14
[52] U.S. Cl. ..................................... 250/578; 358/293
[58] Field of Search ............ 250/204, 209, 578, 211 J; 358/212, 213, 293, 294; 357/24 LR, 31, 32

[56] References Cited

U.S. PATENT DOCUMENTS

| | | | |
|---|---|---|---|
| 4,149,091 | 4/1979 | Crean et al. .................. | 250/566 |
| 4,204,230 | 5/1980 | Sprague ...................... | 358/213 |
| 4,404,594 | 9/1983 | Hannan ....................... | 358/213 |
| 4,432,017 | 2/1984 | Stoffel et al. ................ | 358/213 |
| 4,438,457 | 3/1984 | Tandon et al. ................ | 358/213 |
| 4,471,375 | 9/1984 | Oritsuki et al. ............... | 357/30 |
| 4,547,676 | 10/1985 | Suzuki et al. ................ | 250/578 |

*Primary Examiner*—David C. Nelms
*Attorney, Agent, or Firm*—Fitzpatrick, Cella, Harper & Scinto

[57] ABSTRACT

An original reader has first and second arrays of line sensor chips having reading positions shifted from each other, a moving mechanism for moving the line sensors and an original relative to each other in accordance with a selected magnification of the original, CCD registers for delaying outputs from the first array of line sensor chips to match them with those from the second array of line sensor chips, and an analog switch for controlling the shifting operation of the registers. The reader can read an original image and reproduce the read image without adverse effect of an error between the reading positions of the sensors.

17 Claims, 20 Drawing Figures

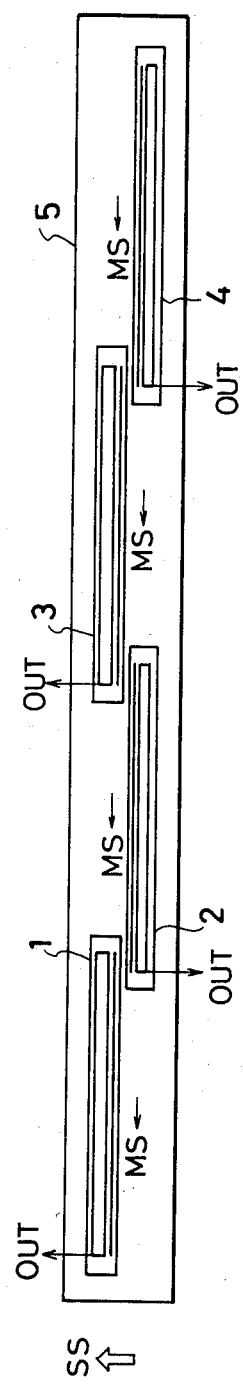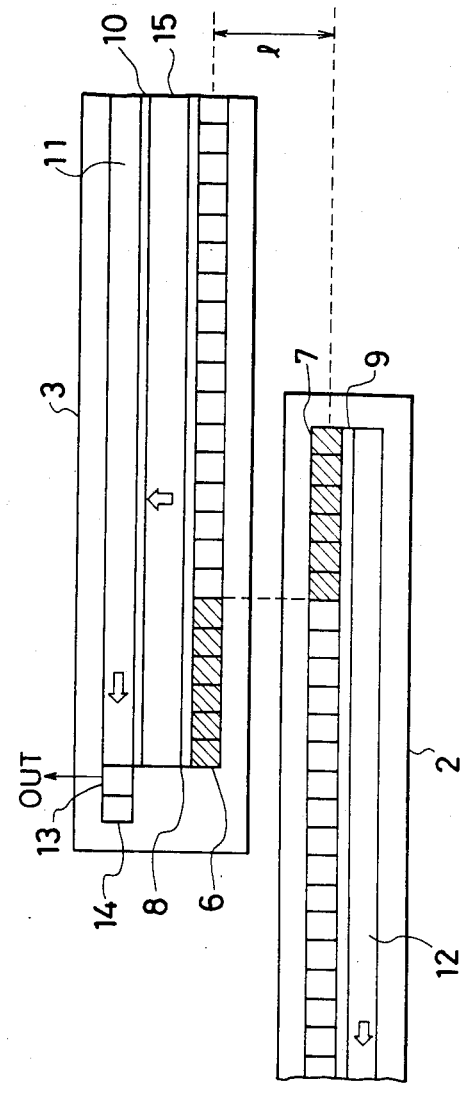
FIG.1(a)
FIG.1(b)

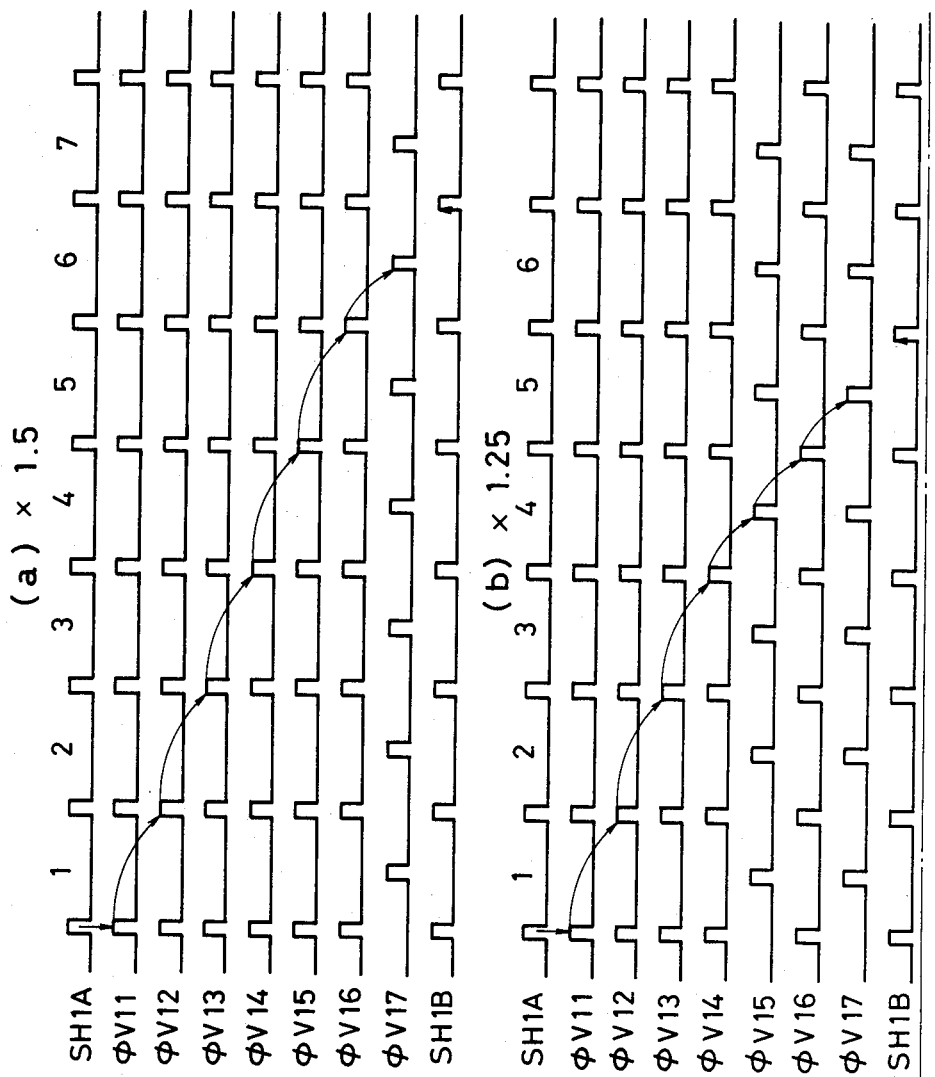
FIG.3A
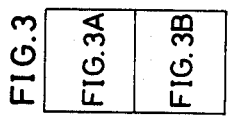

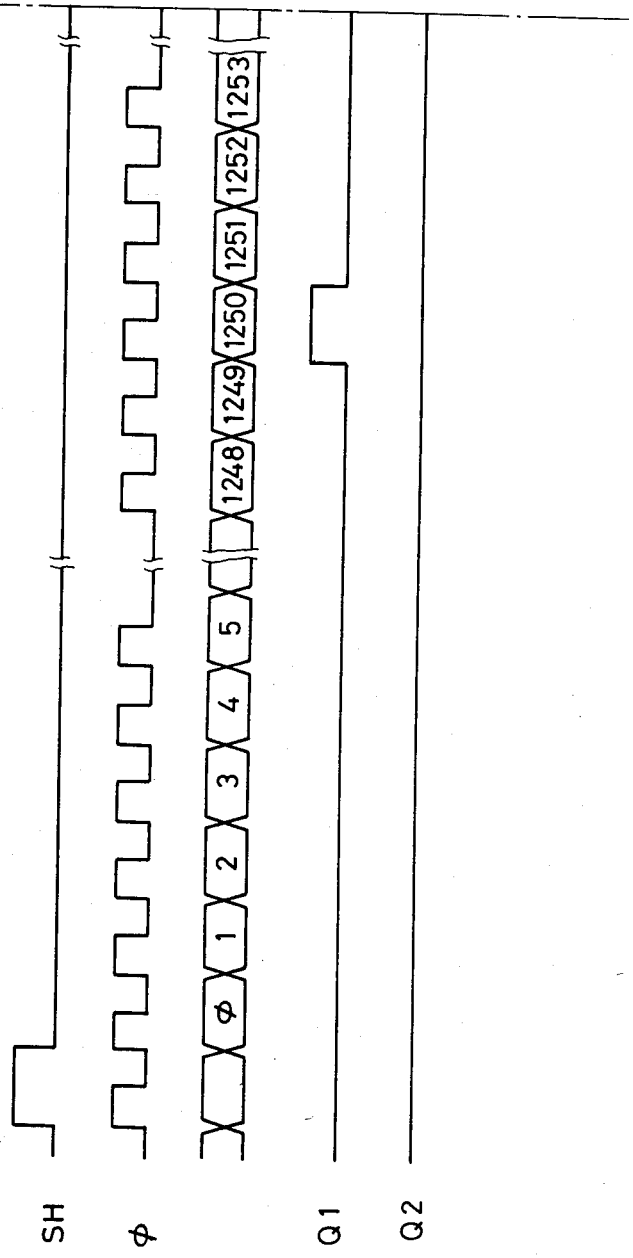

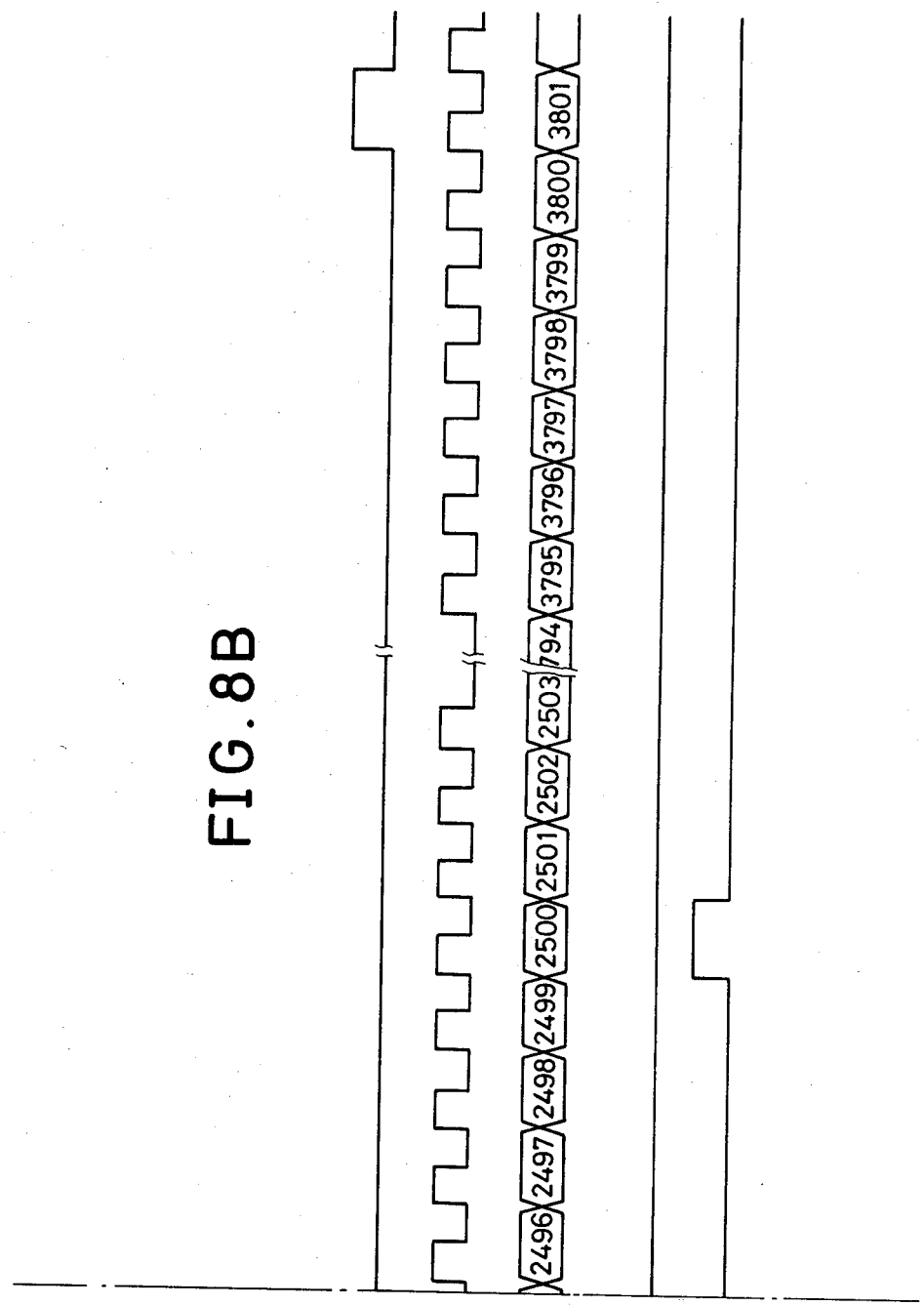

ORIGINAL READER WITH VARIABLE MAGNIFICATION AND TIME DELAY

BACKGROUND OF THE INVENTION

1. Field of the Invention

The present invention relates to an original reader for photoelectrically reading an original image and forming an image signal.

2. Description of the Prior Art

A known line sensor has an array consisting of a plurality of photosensor elements of amorphous silicon or the like arranged widthwise (i.e., across the width) of an original for photoelectrically reading a density of an original image. When an A4 size original is read in the equal size copy mode at a resolution of 16 pixels/mm along the widthwise direction (about 210 mm), a line sensor consisting of about 3,500 photosensor elements on a substrate having a side of about 300 mm is required. However, it is expensive to form such a large number of photosensor elements on a single substrate without errors and with uniform sensitivity unless a great improvement in manufacturing yield is made.

It is possible to use a plurality of line sensors each having 1,000 photosensors arranged along the scanning direction to read an image in a divided manner. With this method, since the number of photosensors to be formed on a single substrate is reduced, the problem of cost due to a low manufacturing yield can be resolved to some extent.

However, non-effective bits which do not contribute to image reading are present at the ends of each line sensor. Therefore, when a plurality of line sensors are arranged on a line, gaps occur. To prevent this, the line sensors can be staggered so that the reading lines of the adjacent line sensors overlap each other.

When a plurality of line sensors are staggered, if adjacent line sensors read an original image by moving vertically relative to each other along different original image portions in the reading/scanning direction, there is a time lag between signals from the first array of line sensors and those from the second array.

Because of this time lag, in a copying machine or the like having a high resolution, of 16 pixels/mm, for example, the image formed is adversely affected. The time lag also adversely affects the color balance when an original image is a color image.

When an original image is reproduced on an enlarged or reduced scale, the relative speed between an original to be read and the line sensor is changed in accordance with a selected magnification. When image reading at a desired magnification is performed with a line sensor consisting of a plurality of line sensors arranged in a staggered manner, time lag between reading of an image line read by a previous line sensor and that by a next line sensor varies in accordance with a selected magnification. Therefore, the problem of time lag due to the specific arrangement of the line sensor is made worse.

SUMMARY OF THE INVENTION

The present invention has been made in consideration of this and has as its object to provide an original reader capable of obtaining excellent image signals.

It is another object of the present invention to provide an original reader which is compact and is capable of reading an image at a high resolution.

It is still another object of the present invention to provide an original reader which is free from problems caused by the deviation between the reading positions of respective sensors when an original is read by a plurality of line sensors.

It is still another object of the present invention to provide an original reader which can reliably read an image and reproduce the read image at a desired magnification.

According to the present invention, the foregoing objects are attained by providing an original reading comprising a plurality of line sensors each consisting of a plurality of photosensor elements arranged so that lines read by adjacent sensors differ from each other, means for moving the sensors and an original relative to each other with a speed corresponding to a reading magnification of the original, and means for delaying output from the line sensor scanning a given line of the original immediately before that being scanned by an adjacent line sensor, the delay time being varied in accordance with the magnification.

The above and other objects, features and advantages of the present invention will be more fully appreciated from the following description taken in conjunction with the accompanying drawings.

BRIEF DESCRIPTION OF THE DRAWINGS

FIG. 1(a) is a schematic view showing a light-receiving surface of a multi-chip CCD sensor;

FIG. 1(b) is an enlarged view of a connecting portion between line sensor chips;

FIGS. 3, 3A and 3B illustrate a timing chart for explaining the reading operation;

FIGS. 5, 5A and 5B illustrate a block diagram of the reader;

FIGS. 8, 8A and 8B illustrate a timing chart for explaining the operation timing of the $\phi V$ generator shown in FIG. 7;

DETAILED DESCRIPTION OF THE PREFERRED EMBODIMENTS

Figure 2:
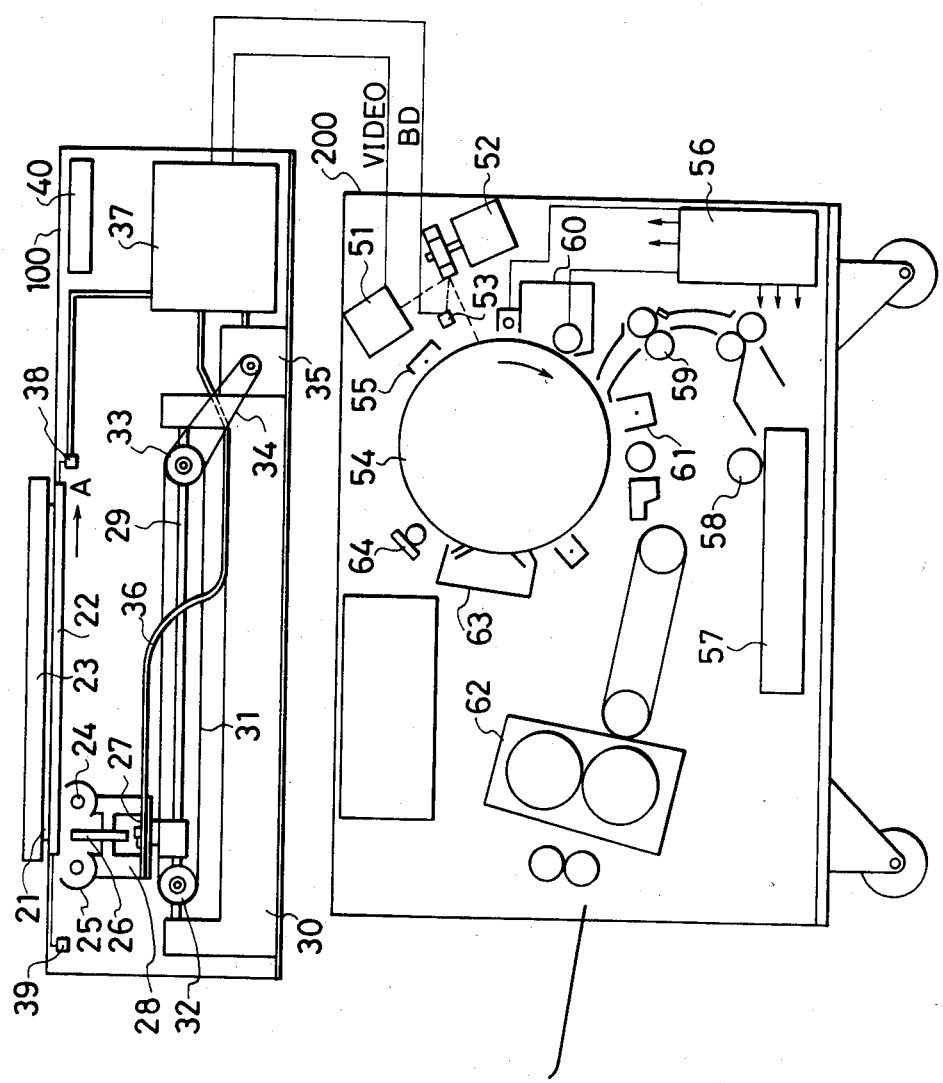
FIG. 2 is a sectional view showing the construction of a copying machine.

The preferred embodiments of the present invention will now be described with reference to the accompanying drawings.

In accordance with the first preferred embodiment of the present invention, when an original is line-scanned, a plurality of line sensors are arranged in a staggered manner so that reading positions of the adjacent lines do not overlap, so as to achieve divisional reading of an original. Therefore, as described above, there is an error between the reading positions of the adjacent line sensors. In order to obtain continuous signals of one line from the image signals derived from divisional reading by a plurality of line sensors, signals of at least the first array of line sensors, i.e., those scanning the original first, are stored once and are read out in synchronism with a signal output from the second array of line sensors.

FIG. 1(a) is a schematic view of a light-receiving surface of a multi-chip CCD sensor wherein a plurality of line sensor chips 1 to 4 each comprising an array of a plurality of photosensor elements of amorphous silicon are arranged in a staggered manner on a substrate 5. Referring to FIG. 1(a), each of the line sensor chips 1 to 4 scans in a direction indicated by arrows MS and produces at an output terminal OUT an analog signal for each pixel which corresponds to the incident light intensity in synchronism with a predetermined clock pulse. Each of the line sensor chips 1 to 4 consists of 1,056 photosensor elements of which 1,024 elements are effective for reading the image. Therefore, a total of $1,024 \times 4 = 4,096$ photosensor elements are used for image reading, enabling one line along the widthwise direction of an A4 size image ($210 \times 297$ mm) to be read at a resolution of 16 pixels/mm.

In actual original image reading, the multi-chip CCD sensor moves relative to the original in a direction (indicated by arrow SS) perpendicular to the main scanning direction of the line sensors. Therefore, the line sensor chips 1 and 3 read the original before the line sensor chips 2 and 4, by a predetermined number of lines (4 lines in this embodiment).

FIG. 1(b) is an enlarged view of a connecting portion of the adjacent line sensor chips 2 and 3. Arrays 6 and 7 of photosensor elements are formed in the line sensor chips 2 and 3, respectively. Hatched portions are a predetermined number (6 in this embodiment) of non-effective elements which are not used for reading, are present at the ends of the array of photosensor elements, and produce dummy bits. Adjacent line sensor chips are arranged such that the boundaries between effective and non-effective elements in each chip coincide with each other and the arrays of the respective chips are spaced apart by a distance corresponding to a predetermined line interval l (4 lines in this embodiment).

Shift gates 8 and 9 perform parallel transfer of charges which are accumulated in the respective photosensor elements of the arrays 6 and 7 in accordance with incident light. Horizontal CCD registers 11 and 12 serially transfer parallel charges (analog signals) in the main scanning direction in accordance with transfer clocks. The charge transferred to the horizontal CCD register 11 is converted into a voltage signal by an output section 13 and produced. A reset gate 14 is provided for erasing the charge converted into a voltage signal at the trailing edge of the transfer clock corresponding to each pixel. An output section and a reset gate are also arranged at one end (not shown) of the horizontal CCD register 12.

A vertical CCD register 15 and a shift gate 10 are arranged between the shift gate 8 of the line sensor chip 3 and the horizontal CCD register 11. The vertical CCD register 15 has a plurality of CCD registers for parallel transfer of the parallel charge outputs from the shift gate 8. The shift gate 10 performs parallel transfer of charges transferred to the vertical CCD register 15 to the horizontal CCD register 11. The shift gate 9 of the line sensor chip 2 and the horizontal CCD register 11 are directly connected to each other.

More specifically, the line sensor chip 3 reads an original before the line sensor 2. The vertical CCD register 15 for a predetermined number of lines delays the output from the line sensor 3 for a time corresponding to the reading position error (interval l = 4 lines) and to the selected magnification. The line sensor chip 1 shown in FIG. 1(a) has the same configuration as that of the line sensor chips 3, 4 and 2, and is arranged in the same manner as in FIG. 1(b).

FIG. 2 is a sectional view showing the construction of a copying machine adopting the multi-chip CCD sensor shown in FIG. 1. A reader unit 100 photoelectrically reads an original image and produces digital image signals VIDEO. A printer unit 200 records an image in accordance with the black/white video image signals VIDEO from the reader unit 100.

In the reader unit 100, an original 21 is placed on a transparent glass original table 22 over which a cover 23 is closed. An exposure lamp 24 exposes the original. A reflecting mirror 25 is for guiding light from the illumination lamp 24 to the original. A short focal distance imaging lens 26 is for guiding light reflected from the original. A multi-chip CCD sensor 27 as shown in Fig.1 converts a light image imaged by the imaging lens 26 into electrical signals. A reciprocal sensor fixing table 28 securely holds the illumination lamp 24, the reflecting mirror 25, the lens 26, and the multi-chip CCD sensor 27. A shaft 29 holds the table 28. A stationary table 30 supports the shaft 29. A wire 31 transmits a reciprocating force to the table 28. A roller 32 transmits the driving force of the wire 31. A drive roller 33 holds the wire 31 and is connected to a rotary drive source. A drive wire 34 connects a drive source with the drive roller 33. A motor 35 serves as a drive source. A cable 36 is for transmitting an output from the multi-chip CCD sensor 27. A control processing unit 37 controls the output from the multi-chip CCD sensor 27 and the operation of the illumination lamp 24, the motor 35 and the like. A forward limit SW 38 is operated by the table 28. A home position sensor 39 detects the home position of the table 28. An operation panel 40 is used for inputting a copy command or the like.

The operation of the reader unit will be described. When a copy command is received from the operation panel 40, a signal causing the illumination lamp 24 to turn on is supplied from the control processing unit 37. The motor 35 is rotated in the forward direction and the table 28 starts to move in the direction indicated by arrow A. The original 21 is scanned for each line of an optical image by the multi-chip CCD sensor 27 moving in the subscanning direction and is converted into electrical signals. The table 28 which has reached the end point of the forward movement operates the forward limit SW 38. Then, the motor 35 begins to rotate in the reverse direction and the table 28 is moved back to the home position. When the home position sensor 29 is operated, the motor 35 is stopped and the table 28 is stopped at the home position.

When magnification change reading is performed, the reading period for each line of the image is kept constant, and the moving speed of the table 28 in the subscanning direction (direction A) is changed in accordance with a selected magnification. For example, when the magnification is 0.5, the subscanning speed is set to be twice that of the equal-size copy mode. When the magnification is 2, the subscanning speed is set at ½ that of the equal size copy mode. The moving speed is changed by changing the rotating speed of the motor 35, or by keeping the speed of the motor 35 constant and incorporating a reduction gear.

In the multi-chip CCD sensor 27, during forward movement in the direction A or subscanning direction, the line sensor chips 1 and 3 read the image of main scanning lines of the original before the chips 2 and 4. This will be described with reference to the timing chart shown in FIG. 3 and the diagram of the multi-chip CCD sensor shown in FIG. 4.

Figure 4:
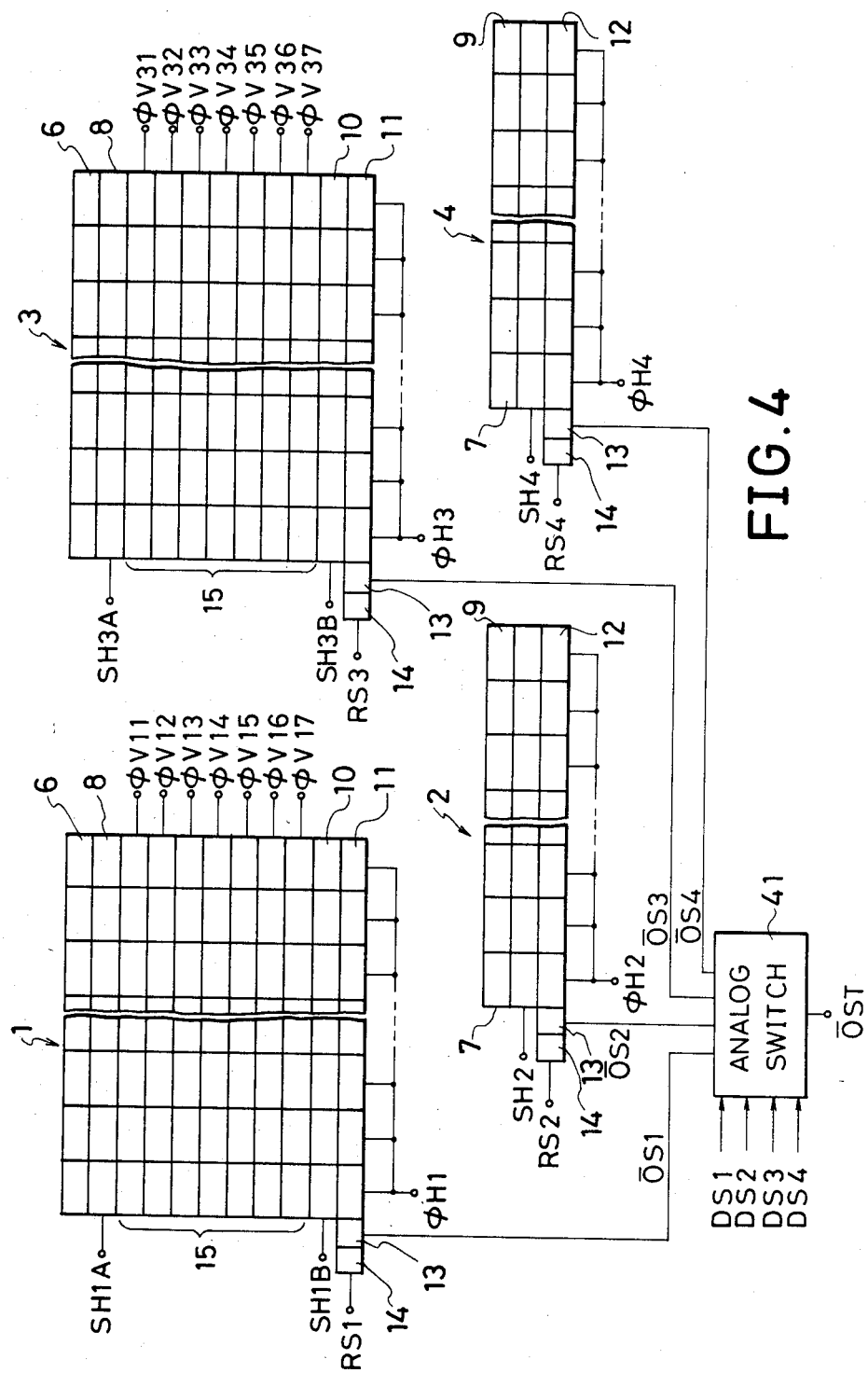
FIG. 4 is a view showing the configuration of a multi-chip CCD sensor.

Referring to FIG. 4, the same reference numerals denote the same parts having the same functions as in FIG. 1(b). An analog switch 41 selects an output from the chips 1 to 4 in accordance with data select signals DS1 to DS4 and produces the selected signal as an output signal OST. Horizontal transfer clocks $\phi H1$ to $\phi H4$ are used to perform transfer operations of the horizontal CCD registers 11 and 12 of the line sensor chips 1 to 4. Vertical transfer clocks $\phi V11$ to $\phi V17$ and $\phi V31$ to $\phi V37$ perform the transfer operation of the vertical CCD registers 15 of the line sensor chips 1 and 3. Reset signals RS1 to RS4 are for the reset gate 14 of each line sensor chip. Shift signals SH1A, SH1B, SH2, SH3A, SH3B, and SH4 are for performing the shift operation of the shift gates 8, 9 and 10 of each line sensor chip. The respective line sensor chips produce output signals OS1 to OS4.

As illustrated in FIG. 4, in each of the line sensors 1 and 3, i.e., the line sensor chips which read before the other chips, vertical CCD register 15 corresponding to 7 lines is interposed between the shift gates 8 and 10.

The pulse signal shown in FIG. 3 drives the shift gates 8 and 10 in the line sensor chip 1 and illustrates the relationship between the shift pulses SH1A and SH1B for performing parallel image output and vertical transfer clocks $\phi V11$ to $\phi V17$.

Figure 3B:
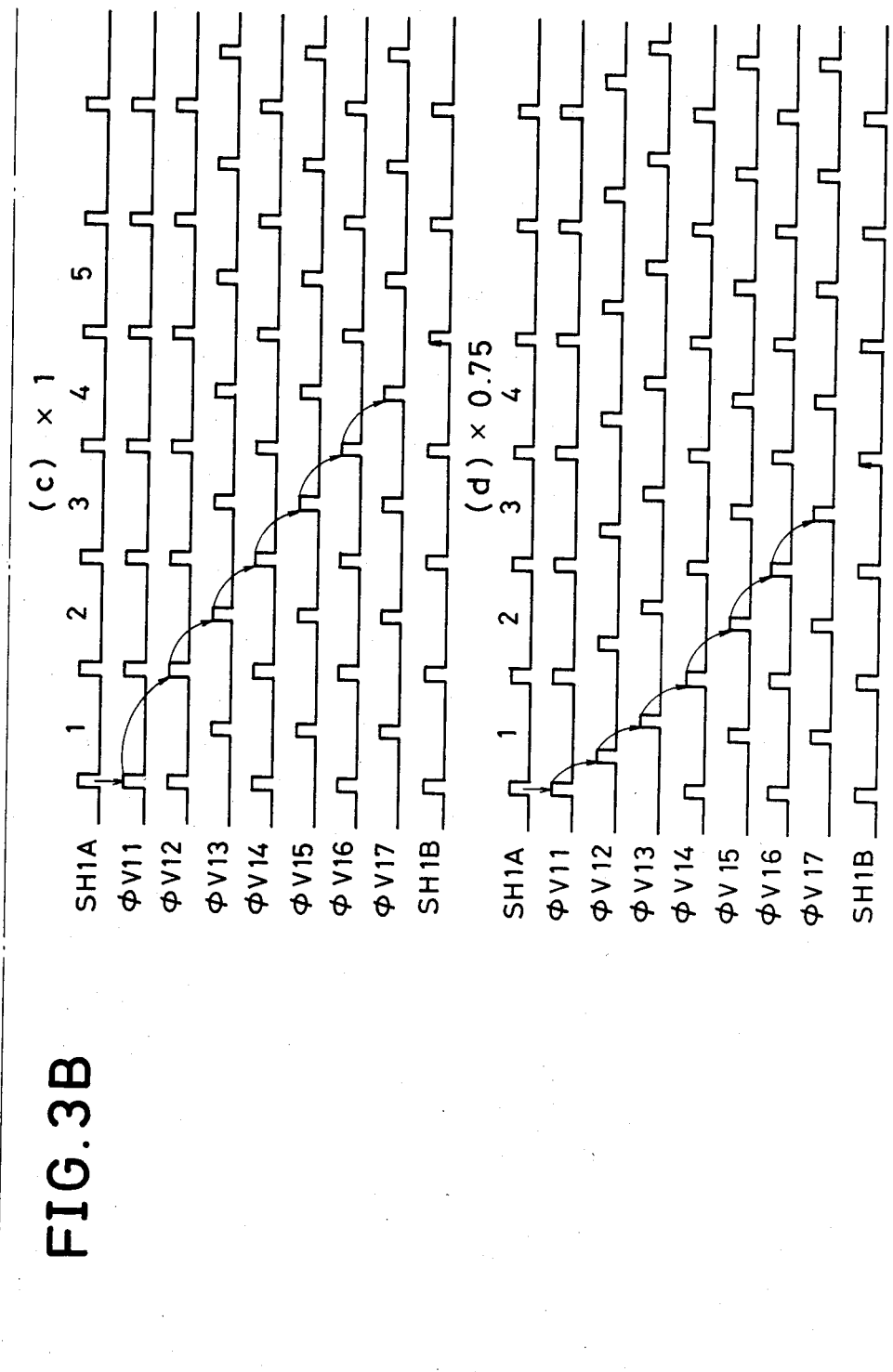

As in this embodiment, in a multi-chip CCD sensor wherein a plurality of line sensor chips are arranged in a staggered manner with a distance between them corresponding to 4 lines, image output signals of the same line read at different timings by the first and subsequent line sensor chips must be serially and continuously produced. For this purpose, vertical CCD registers are provided for delaying the output from the previous line sensor chips by a predetermined delay time. In order to allow magnification-change reading of an image, the number of stages (number of lines) of the vertical CCD register 15 must be set in accordance with a selected magnification. For example, in the case of enlargement at a magnification of 1.5, the subscanning speed of the reading section (sensor fixing table 28) is reduced to ⅔ the normal speed. Therefore, there will be a time lag corresponding to 7 lines between the time a line is scanned by the line sensor chip 1 and when it is scanned by the line sensor chip 2. Therefore, if enlargement reading at a magnification of 1.5 is to be possible, a vertical CCD register of 7 lines must be provided. The minimum number of stages required by the vertical CCD register is expressed as follows: (required magnification)÷{1/(error between line sensors)} line+1. Therefore, in this embodiment, since the required magnification is 1.5 times and the error between the line sensors is 4 lines, 1.5÷(¼)+1=7 is obtained, and at least 7 stages of vertical CCD register are required. When the magnification is 1.25, the scanning speed at the reading section is 4/5 times the normal speed. With a scanning time error of 6 lines, the line sensor chips 2 and 1 read the same line. Therefore, before the vertical shift clock signals $\phi V11$ to $\phi V17$ are controlled independently of each other as shown in FIG. 3(b) to start scanning the sixth line, the read signal of the first line is transferred to the vertical CCD register of the seventh line. The read signal of the first line is transferred to the horizontal CCD register 11 by the second shift signal SH1B from the line sensor 1 which is synchronous with the shift signal SH2 supplied to the line sensor chip 2. Then, an output OS1 from the line sensor chip 2 with a scanning time lag of 6 lines can be obtained at the same timing as an output OS2 from the line sensor chip 2. Therefore, the read signal OS1 synchronous in the subscanning direction is produced.

Similarly, when the magnification is 1 or 0.75, the vertical shift clock signals $\phi V11$ to $\phi V17$ are controlled independently of each other in accordance with a magnification so as to control the shift timings of the respective shift registers constituting the vertical CCD registers 15. The output from the line sensor chip 2 is thus delayed by the scanning time delay. In this manner, the output signals OS1 and OS2 from the line sensor chips 1 and 2 are produced as the read outputs of the same line in synchronism with each other. The horizontal transfer clock $\phi H1$ is controlled so as to transfer all the pixels from the horizontal CCD register 11 within an interval (interval 1/n where n is 4 while the chip number of the contact-type line sensor is 4) corresponding to the line scanning interval (SH interval). After the completion of output generation from the line sensor chip 1, the line sensor chips 2 to 4 are subsequently operated. The line sensor chips 2 to 4 are sequentially operated by the respective horizontal transfer clocks $\phi 2$ to $\phi 4$. The read signals of the chips 1 to 4 are sequentially transferred in different phases within one line scanning interval. In order to achieve this, when transfer operation for the chip 1 is completed, the corresponding line switch of the switch 41 is disconnected, and the switch for selecting the transfer output of the next chip 2 is turned on. Then, a continuous signal of one line is produced onto the output line OST. Switching operation of the analog switch 41 is performed in accordance with the data select signals DS1 to DS4 (to be described later).

The printer 200 (FIG. 2) is a laser beam printer which records an image in accordance with video image signals VIDEO from the reader 100 and adopts the electrophotographic method using a laser beam.

A laser unit 51 of the printer 200 produces a modulated output in accordance with the signals VIDEO from the reader 100. A scanner unit 52 is for scanning the laser beam. A BD (beam detect) detector 53 produces a BD signal for horizontal synchronization for image recording or the like in accordance with a laser beam from the scanner unit 52. A photosensitive drum 54 is rotated at a constant speed in a direction indicated by the arrow. A charger 55 charges the drum 54. A high-voltage unit 56 applies a voltage to the charger 55 or the like. Copy sheets 57 are housed in a cassette and are picked up by a pickup roller 58. Register rollers 59 align the leading end of the picked-up copy sheet with the leading end of an electrostatic latent image formed by irradiating the drum 54 with a laser beam. A developing unit 60 applies toner to the latent image to convert it into a visible image. A transfer unit 61 transfers the visible image (toner image) onto the copy sheet supplied at a predetermined timing by the register rollers 59. A fixing unit 62 melts toner on the copy sheet. A cleaner 63 removes excess toner on the drum 54 after the transfer operation. A charge removal lamp 64 removes the potential on the surface of the drum 54.

The mode of operation of the copying machine will be described below.

The drum 54 is charged to a uniform potential by the charger 55. A signal VIDEO from the reader 100 is supplied to the laser unit 51 as a modulation signal of the laser beam. The laser unit 51 produces a laser beam modulated in accordance with the signal VIDEO, and the modulated laser beam is scanned in a direction perpendicular to the drum rotating direction by the scanner unit 52. The electrostatic latent image formed on the drum 54 is visualized by the developing unit 60. Toner on the drum 54 is transferred by the transfer unit 61 onto the copy sheet conveyed in synchronism with the register rollers 59. Thereafter, the toner image on the transfer sheet is fixed by the fixing unit 62, and the sheet is conveyed outside the copying machine.

Figure 5A:
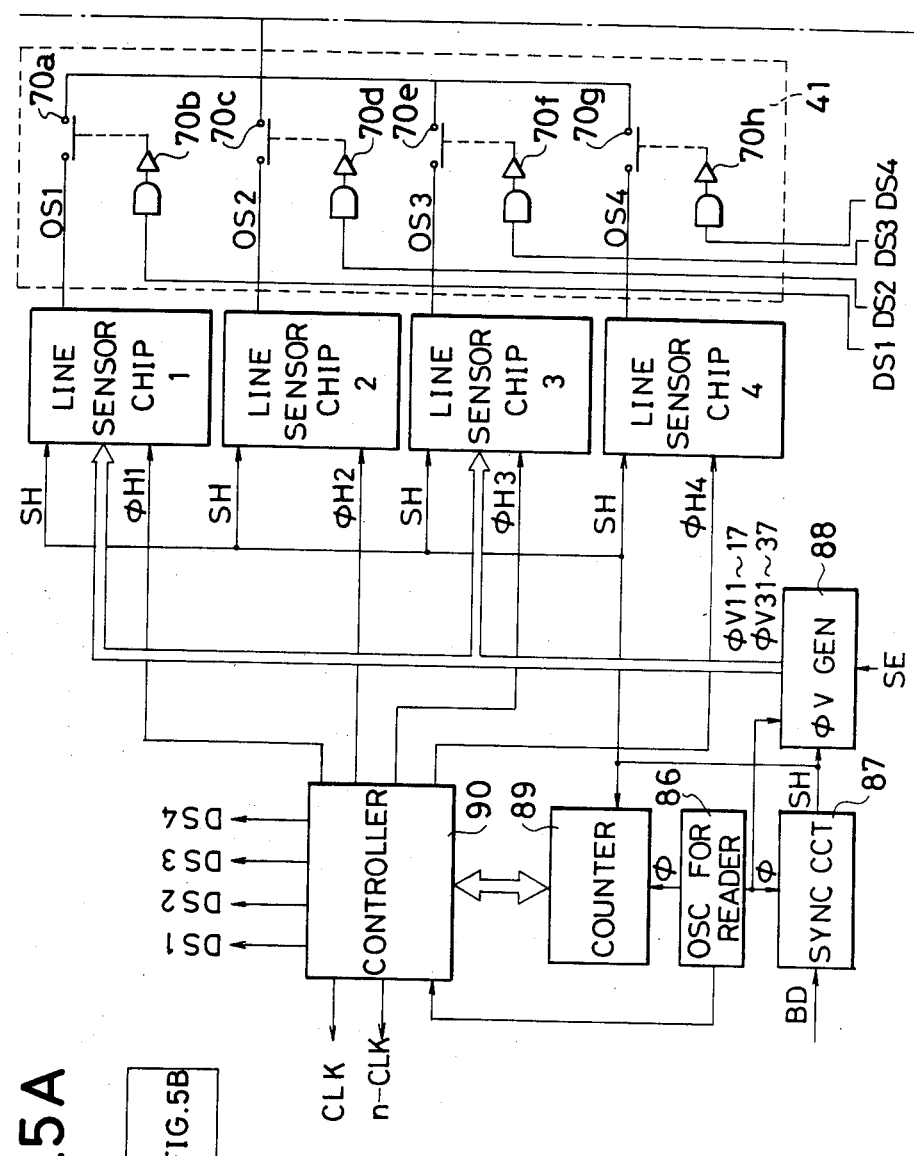
Figure 5B:
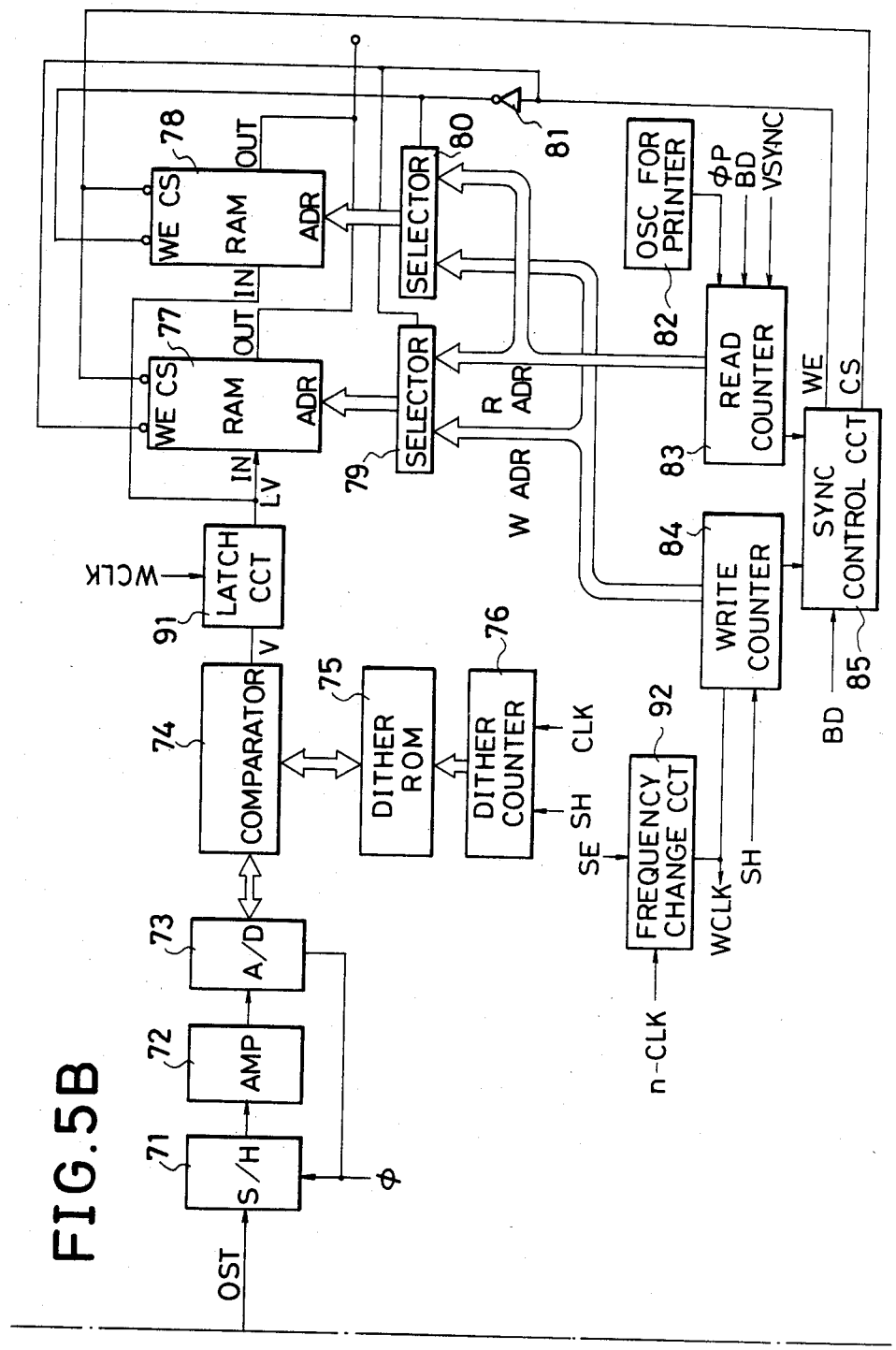
Figure 6:
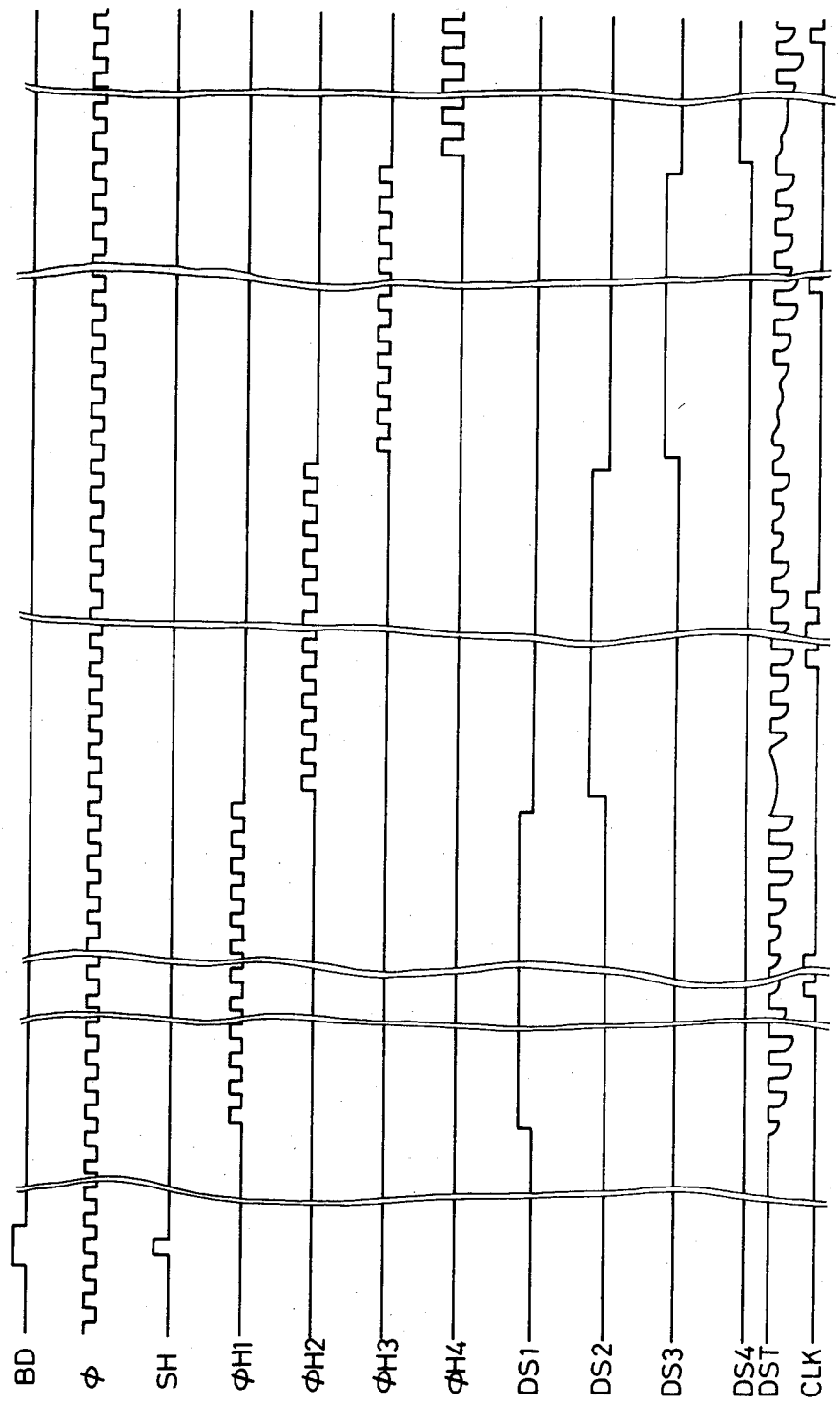
FIG. 6 is a timing chart for explaining the output states of respective circuit components.

The circuit diagram for forming the digital image signal VIDEO supplied to the printer 200 is shown in FIG. 5. FIG. 6 shows the output image timing.

Analog switches 70a and 70b shown in FIG. 5 switch the output OS1 from the chip 1. Analog switches 70c and 70d switch the output OS2 from the chip 2. Analog switches 70e and 70f are for the chip 3, and 70g and 70h are for the chip 4 (portions surrounded by the dotted line correspond to the analog switch 41 shown in FIG. 4). A sample-and-hold circuit 71 is for keeping the output time of the output signal constant. An amplifier 72 is for amplifying an input signal. An A/D converter 73 converts an analog signal into a digital signal of a predetermined number of bits. A comparator 74 compares the digital signal with a threshold value to generate a binary signal corresponding to black and white. A dither ROM 75 supplies prestored digital data to the comparator 74 as a threshold value. A dither counter 76 is for determining the output address of the dither ROM 75. RAMs 77 and 78 alternately store in units of lines bit data obtained by comparing the value of the dither ROM 75 with the image data by the comparator 74. A latch circuit 91 transfers an output from the comparator 74 to the RAM 77 or 78 by a clock WCLK in synchronism with the address signal supplied to the RAM 77 or 78 when the output from the comparator 74 is written in the RAM 77 or 78. An address selector 79 supplies a read or write address to the RAM 77. An address selector 80 supplies a read or write address to the RAM 78. An inverter 81 inverts a signal WE which is alternately inverted for each input of interval BD from a sync control circuit 85 in synchronism with the signal BD as a sync signal of one line from the printer 200. An oscillator 82 is for controlling the output of the signal in accordance with the characteristics (recording speed) of the printer 200. A read counter 83 counts oscillation clocks $\phi P$ from the printer oscillator 82. A frequency change circuit 92 receives a clock n-CLK (the frequency of the clock n-CLK is twice the operating frequency $\phi$ of the binary circuit in front of it in this embodiment). The frequency change circuit 92 samples the clock signals n-CLK in accordance with a magnification signal SE and produces clocks WCLK of a changed frequency. In this embodiment, the circuit 92 comprises a decimal counter. A write counter 84 counts input clocks WCLK from the frequency change circuit 92. A sync control circuit 85 controls the read and write operations of the RAMs 77 and 78.

A reader oscillator 86 produces the clock pulse $\phi$ which determines transfer of the read output from the CCD sensor. A BD sync circuit 87 synchronizes the reader oscillator 86 with the BD signal from the printer 200 and generates an SH pulse to the multi-chip CCD sensor. A $\phi V$ generator 88 generates vertical transfer clocks $\phi V11$ to $\phi V17$ and $\phi V31$ to $\phi V37$ for shifting the vertical CCD registers 15 of the odd-numbered chips of the CCD sensor, i.e., the line sensor chips 1 and 3, in accordance with the magnification signal SE, as shown in FIG. 3.

Figure 7:
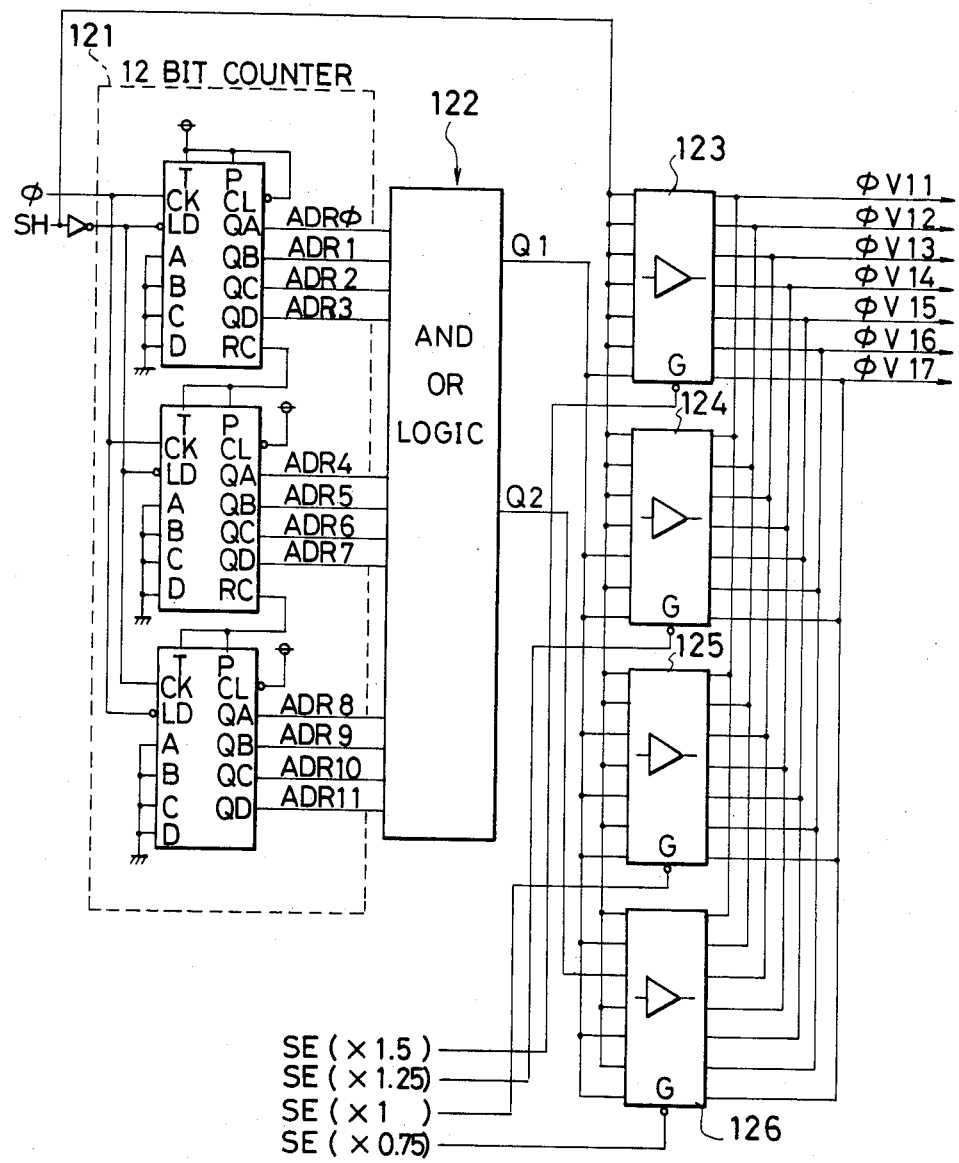
FIG. 7 is a block diagram showing the configuration of a $\phi V$ generator.

FIG. 7 shows the circuit configuration of the $\phi V$ generator 88 for generating the vertical transfer clocks $\phi V11$ to $\phi V17$ of the line sensor chip 1. FIG. 8 shows a timing chart of the $\phi V$ generator 88. Vertical transfer clocks $\phi V31$ to $\phi V37$ for the line sensor chip 3 are similarly obtained.

The $\phi V$ generator 88 consists of a 12-bit counter 121 for counting the clock $\phi$ from the reader oscillator 86, an AND/OR logic circuit 122, and four tristate bus buffers 123 to 126. The 12-bit counter 121 and the AND/OR logic circuit 122 together generate pulses Q1 and Q2 as shown in FIG. 8 within one H period (one line scanning interval) from the output of the SH pulse to the next SH pulse. In this embodiment, the 1 H period, i.e., the generation interval of the BD signal in the printer 200 corresponds to about 3,800 clocks. The pulse Q1 is generated at the 1,250th clock, and the pulse Q2 is generated at the 2,500th clock. Therefore, the AND/OR logic circuit 122 decodes the address (count output) from the 12-bit counter 121 and generates the pulses Q1 and Q2 when the count reaches 1,250 and 2,500, respectively.

The pulses Q1 and Q2 and the signal SH generated in this manner are supplied to the four tristate buffers 123 to 126. One of the tristate buffers 123 to 126 is selected in accordance with the signal SE supplied to the output control G of each tristate buffer in correspondence with a magnification selected by the operator. More specifically, when a magnification of 1.5 is selected, the signal SE ($\times 1.5$) goes low and the tristate buffer 123 is selected. When a magnification of 1.25 is selected, the tristate buffer 124 is selected. When the equal size copy mode is selected, the tristate buffer 125 is selected. When a magnification 0.75 is selected, the tristate buffer 126 is selected. When the magnification of 1.25 is selected, the tristate buffer 124 is selected. The tristate buffer 124 generates the input SH pulse as the vertical transfer clocks $\phi V11$, $\phi V12$, $\phi V13$, $\phi V14$, and $\phi V16$. The tristate buffer 124 generates the input pulse Q1 as the vertical transfer clocks $\phi V15$ and $\phi V17$. Thus, the vertical transfer clocks $\phi V11$ to $\phi V17$ as shown in FIG. 3(b) are formed.

Referring back to FIG. 5, a counter 89 counts in accordance with the oscillation signal $\phi$ from the reader oscillator 86 and the SH pulse. A controller 90 generates horizontal transfer clocks $\phi H1$ to $\phi H4$ for transferring all the line sensor chips during the SH signal period in accordance with the count of the counter 89, clocks CLK synchronous with the clocks $\phi H1$ to $\phi H4$, and switch signals DS1 to DS4 of the analog switch 41.

The operation of the circuit shown in FIG. 5 will be described. A BD sync circuit 47 synchronizes the oscillation signal $\phi$ from the reader oscillator 86 and the BD signal form the printer 200. The circuit 47 supplies the wave-shaped BD signal to the SH terminal of each chip as the SH pulse. Then, charges are transferred parallel to each other by the photosensor elements of the line sensor chips 1 to 4. In the line sensor chips 1 and 3, charge transfer from the final stage of the vertical CCD register 15 to the horizontal CCD register 11 is performed.

In the odd-numbered chips, i.e., in the line sensor chips 1 and 3 which read an image first, the charges transferred from the photosensor element array 6 are transferred at the vertical CCD registers 15 in accordance with the vertical transfer clocks $\phi$V11 to $\phi$V17 and $\phi$V31 to $\phi$V37. The vertical CCD register 15 delays the input signal for the number of spatially different pixels which is determined by the positional error of the adjacent line sensors and the magnification. Thereafter, the register 15 produces the delayed signal in synchronism with the same BD signal, i.e., in synchronism with the line outputs of the adjacent even-numbered chips. At this time, the charges stored in the horizontal CCD register 11 are entirely transferred during a ¼ period of the SH period (1 line scanning interval) by the horizontal transfer pulse $\phi$H1 from the controller 90, as can be seen from the timing chart shown in FIG. 6. For the adjacent chip 2, after the horizontal transfer pulse $\phi$H1 is transferred, the horizontal transfer pulse $\phi$H2 is generated. The horizontal transfer pulses $\phi$H3 and $\phi$H4 are similarly supplied to the chips 3 and 4. In this manner, all the pixels within the entire chip of the multi-chip CCD sensor can be sequentially transferred within the SH period.

When the analog switch 41 is used to connect/disconect the output from a plurality of line sensor chips, a switching time is delayed. However, as described above, since each line sensor chip output has dummy pixels other than in addition to its effective pixels, the response delay of the analog switch 41 can be compensated for. The dummy pixels can be removed by a method to be described later. A high-speed switch can also be used.

With this operation mode, the output OST of the analog switch 41 has a waveform as shown in the timing chart in FIG. 6 wherein the pixel data is produced with an analog level. The output OST is sampled and held by the sample-and-hold circuit 71. After the obtained signal is corrected to match the specifications of the A/D converter 73, it is converted into a digital signal of a predetermined number of bits (e.g., 6-bits, providing 64 gradation levels).

In order to convert the digital signal into dot data representing binary black and white values considering a halftone effect and to supply the obtained dot data to the printer 200, a read address is supplied from the dither counter 76 to the dither ROM 75 so as to perform dither processing. At this time, the dither counter 76 receives clocks CLK which are obtained by removing the transfer clock of a dummy pixel from the horizontal clock $\phi$ from the controller 90. In the dummy pixel region, the address of the dither ROM is interrupted, and an address is generated again for the next effective input pixel. Therefore, the dither matrix does not become discontinuous at the boundaries between the chips 1 and 2, 2 and 3, and 3 and 4. Therefore, an image of poor quality, such as one having a spurious formation of stripes, is not caused.

Dot data V obtained by comparing the value of the dither ROM 75 with the image signal from the A/D converter 73 by the comparator 74 is stored in the line memory RAM 77 or 78 in units of lines at timings synchronized by the latch circuit 91. More specifically, the line memory RAM 77 is set in the write enable state when the WE terminal of the sync control circuit 85 goes low. Then, the selector 79 selects a write address bus from the write counter 84. Thus, an output from the write counter 84 is supplied to the address line of the RAM 77. At this time, as in the case of the dither counter 76, the write counter 84 counts clocks which are obtained by removing transfer clocks of one dummy pixel from clocks, and which are supplied from the controller 90.

When the sync control circuit 85 sets the WE terminal at high level, the write enable terminal WE of the RAM 77 goes low. Since the chip select terminal CS goes low, the RAM 77 is set in the read mode. At this time, the selector 79 selects the read address bus from the read counter 83. Then, the data of the previous line stored in the RAM 77 is read, and is supplied to the printer 200 as the continuous pixel signals Video from which dummy pixels are removed. At the same time, a signal of low level is supplied to the RAM 78 through the inverter 81, and the write enable terminal WE of the RAM 77 goes high to set it in the write enable state. In response to an output from the comparator 74, the dot data V from which the dummy pixels are removed is stored in the RAM 78. In this manner, the RAMs 77 and 78 alternately perform read and write operations so as to synchronize the image signals VIDEO of one line with the printer.

The method of magnification change along the main scanning direction will be described below. As described above, the controller 90 generates the clocks CLK which are synchronous with the clock signal $\phi$ for binarizing the photoelectrically converted image signals and from which transfer clocks of dummy pixels are removed; and clock signals n-CLK which are synchronized with the clocks CLK and are supplied to the frequency change circuit 92.

Figure 9:
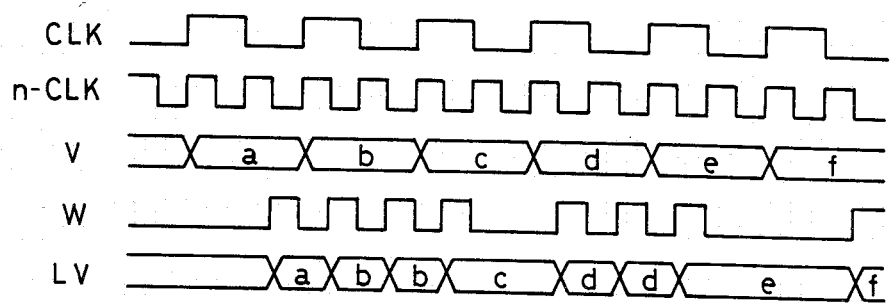
FIG. 9 is a timing chart for explaining the magnification change processing.

The magnification of the image, that is, the copying magnification is determined in accordance with the ratio of the frequency f$\phi$ of the clock signal $\phi$ for binarying the image signal of an original into the binary image signal V to the frequency fW of the clock signal WCLK produced from the frequency change circuit 92. FIG. 9 shows a timing chart when the magnification is 1.5 in such a magnification change processing operation. The dot data V from the comparator 74 is doubled for each other pixel, so that the overall image is enlarged at a magnification of 1.5.

Figure 10:
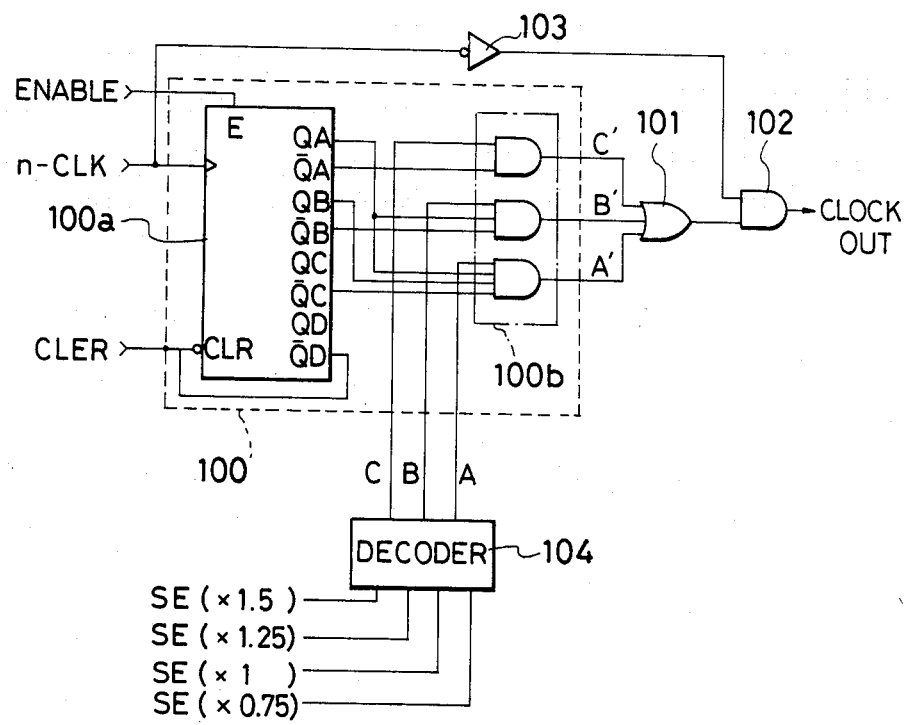
FIG. 10 is a block diagram showing the configuration of a frequency change circuit.
Figure 11:
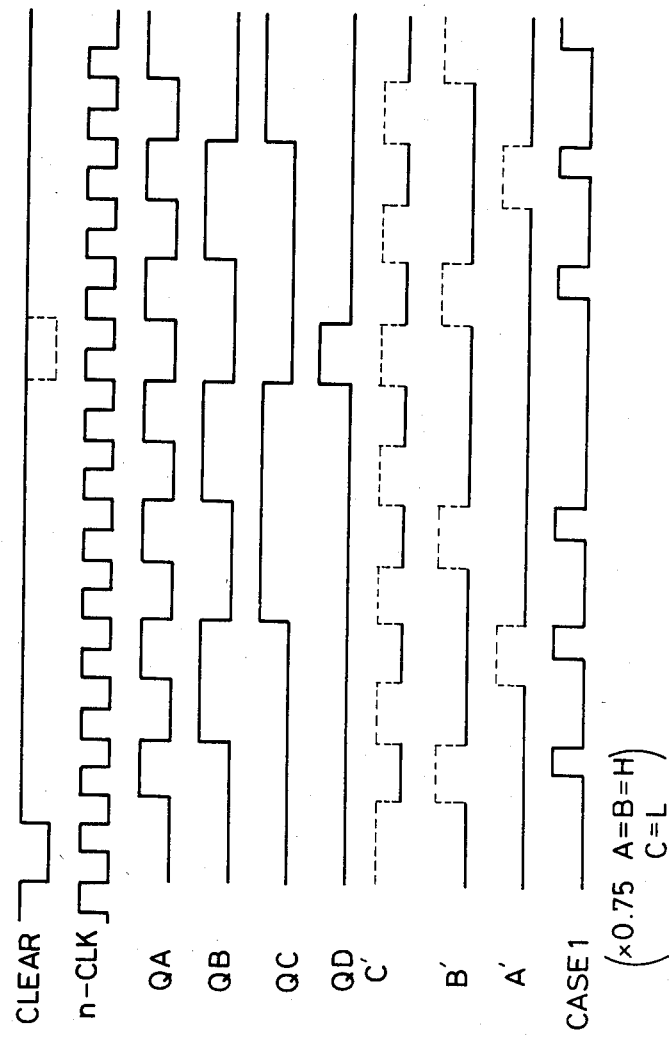
FIG. 11 is a timing chart for explaining the operation of the frequency change circuit.

FIG. 10 is a circuit diagram of the frequency change circuit 92 comprising a decimal counter. A clock rate setting section (to be referred to as a DRM hereinafter) 100 consists of a decimal counter 100a for counting the clocks n-CLK and an AND gate circuit 100b for setting the magnification. FIG. 11 shows a timing chart of the circuit 92.

The AND gate circuit 100b has three AND gates. A signal of high (H) level or low (L) level is supplied to each AND gate as gate signals A, B and C. A decoder 104 receives the magnification signal SE and produces a decoded signal. Clock enable signals A', B', and C' are obtained by a combination of the gate signals A, B, C and D, and signals from output terminals QA, QA, QB, and QC of the decimal counter 100a. The clock enable signals A', B' and C' are supplied through an OR circuit 101 to an AND circuit 102 for performing output gating of the inverted clock n-CLK.

When the signals A, B and C are high, the signals A', B' and C' are at H level, as indicated by dotted lines. The gate signals A, B and C determine the clock rate. For example, when the signals A and B are at H level and the signal C is at L level, an output signal (CLOCK OUT) as in CASE1 is obtained from the AND gate 102. In this case, since three clock signals are produced upon counting 8 clocks, the frequency of the output signal from the frequency change circuit 92 is ⅝ that of the original input clock signal n-CLK. When only the signal C is at H level, the frequency of the output signal is 4/8 that of the clock signal. When the signals B and C are at H level, the frequency of the output signal is 6/8 that of the clock signal. When the signals A and C are at H level, the output signal of the frequency ⅝ that of the clock signal is obtained. The output signal corresponding to the selected magnification can be obtained from the AND gate 102 by suitably combining the gate signals A, B and C from the decoder 104.

Since the clock n-CLK has a frequency twice that of the horizontal transfer clocks $\phi$, the clock output of the frequency corresponding to a desired magnification can be obtained if the gate signals B and C are set at H level in the 1.5 magnification mode, the gate signals A and C are at H level in the 1.25 magnification mode, the signal C is set at H level in the equal size copy mode, and the gate signals A and B are set at H level in the 0.75 magnification mode.

Figure 12:
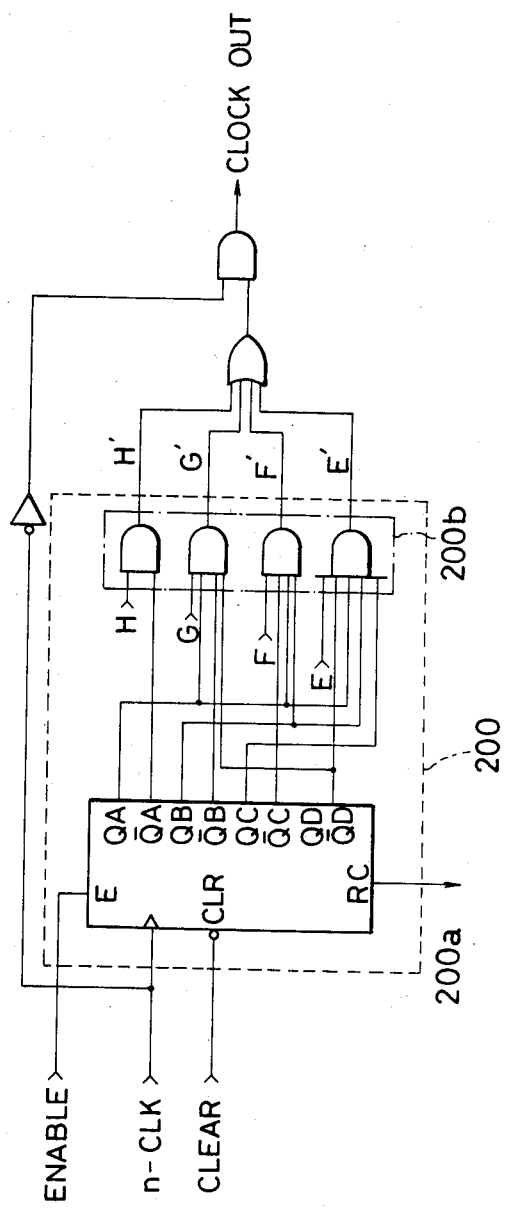
FIG. 12 is a block diagram showing another configuration of the frequency change circuit.

When the frequency change circuit shown in FIG. 10 has the configuration as shown in FIG. 12, clocks of frequencies from 0/10 to 9/10 to 1/10 that of the input clock n-CLK can be obtained by combining the gate signals E to H supplied to an AND circuit 200b. The clock magnification is $1/10 \times (5H+2G+F+E)$.

A terminal RC of the decimal counter 200a shown in FIG. 12 is to be connected to an enable input terminal of the next counter when a plurality of counters are cascaded. An R-base counter for counting from 0 to R can obtained by combining the decimal counters 100a as 4-bit counters. When the clock signal for binarizing the image signal is defined as $\phi$ and that supplied to the DRM 100 is defined as n$\phi$, a clock rate setting S (where $S \leq R$) is determined by the following equation with respect to a desired copy magnification M (%)

$$S = \{(R+1)M\}/100n \tag{1}$$

Since the setting S is an integer, the copy magnification M (%) is set for each $100n/(R+1)$ %. The copy magnification M is maximum, i.e., 100n (%) when $S = R+1$.

A case will be examplified wherein the maximum copy magnification is set at 200% and the copy magnification M is set for each %.

Since the maximum magnification is 200%, n=2. That is, the clock signal supplied to the frequency change circuit 92 has a frequency twice that of the clock signal for binarizing the image signal. Furthermore, since the copy magnification M is set for each %, the maximum count R of the counter constituting the frequency change circuit 92 becomes 199. The clock rate setting S for each desired copy magnification M takes a value such that S=M. Therefore, when the desired magnification M is directly set as the clock rate using a 200-base counter which can count from 0 to 199, enlargement and reduction along the main scanning direction can be performed.

Figure 13:
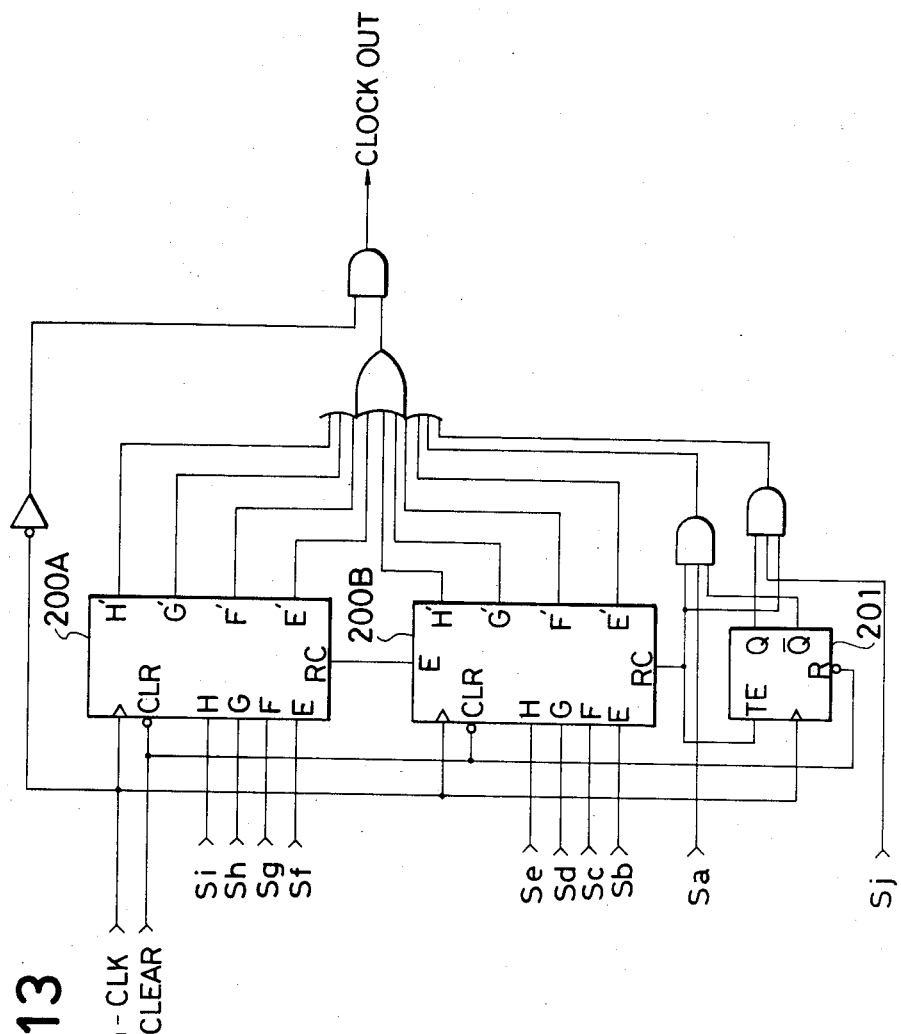
FIG. 13 is a block diagram showing still another configuration of the frequency change circuit.

FIG. 13 shows a circuit diagram of the frequency change circuit 92 for performing the above magnification change processing. Two 4-bit DRMs 200A and 200B and a toggle flip-flop 201 with an enable terminal are cascade-connected to constitute a 200-base counter capable of counting from 0 to 199. The 4-bit DRMs 200 A and 200 B have configurations as shown in the circuit diagram shown in FIG. 12. The clock rate setting is determined by the gate signals received at the input terminals Sa to Si which have a ratio as shown below:

| Si | Sh | Sg | Sf | Se | Sd | Sc | Sb | Sa |
|---|---|---|---|---|---|---|---|---|
| 100/200 | 40/200 | 20/200 | 20/200 | 10/200 | 4/200 | 2/200 | 2/200 | 1/200 |

Clock rate setting from 0 to 199% can be performed by combining the gate signals Si to Sa. When a clock rate of 200% is to be realized with this circuit, the input clock signal can be produced as it is. However, since the signals are not passed through the DRMS 200A and 200B when the clock rate is 200% in contrast to the clock signals of 0 to 199% which are passed through the DRMs, a phase difference corresponding to time delay caused by the DRMs 200A and 200B is generated. This phase difference results in a timing error when the image signal is written in the RAMs 77 and 78. As shown in FIG. 13, when one clock corresponding to 1% is generated utilizing the output signal from the connecting terminal RC, a clock rate of 200% is produced without a phase difference from other clock rates. This 1 clock output is controlled by the gate signal from the input terminal Sj.

The decimal counter used in the above embodiment is not limited to a counter which counts from 0 to 9. The counter therefore can be any counter which performs a decimal operation for repeating the same output state for each 10 clocks and which can realize a combination from 0 to 9 of the clock enable signals E' to H'.

When the rate of change of the image along the main scanning direction is continuously changed within the range of 1 to 200%, the speed control of the scanning motor, the number of vertical transfer CCD registers, and the output state of the vertical transfer clocks $\phi$V are controlled as needed so that a magnification change in the subscanning direction can also be performed by changing the scanning speed.

In the above embodiment, four line sensors are used. However, the number of line sensors is determined in accordance with a desired resolution, a size of an original to be read, or the like. The number of line sensors can therefore be any integer larger than 2.

The present invention is similarly applicable to a reader which uses a reducing optical system in place of a contact reader.

Photosensor elements can consist of crystalline silicon, cadmium sulfide or the like in place of amorphous silicon.

The arrangement of a plurality of line sensors is not limited to a staggered arrangement and need only be an arrangement wherein the reading position is shifted by several lines.

An output section can be an ink-jet printer, a thermal printer or the like in place of a laser beam printer, or an image file or the like for storing image data.

In the above embodiment, an output from each line sensor is switched by an analog switch to obtain serial 1-line signals. However, line sensor chips can produce parallel outputs.

An original reader may be of an original moving type wherein the multi-chip CCD sensors are fixed in position, and the original is moved on the reading positions of the chips.

The number of vertical CCD registers arranged in correspondence with the line sensor chips which read an image first before the other chips is determined in accordance with an error of the chip reading positions and a desired magnification and is not therefore limited to 7. The number can be larger than an actually required number for providing a mechanical margin.

In the above embodiment, vertical CCD registers are used to delay outputs corresponding to the line sensor chips which read an image first before the other chips. However, a delay means can also be arranged for line sensors which read later.

In the above embodiment, reading at a desired magnification is performed by changing the subscanning speed of the reading section and the sampling rate of the image signals along the main scanning direction. However, magnification can be changed at different ratios in both the main scanning direction and subscanning direction. With this arrangement, a vertically elongated or a horizontally elongated image can be reproduced. An image can be recorded on the entire surface of the recording medium irrespective of the ratio of length and width of the recording medium at the recording section.

As described above, when an original image is read with a plurality of line sensors, high-density reading free from the problems of high cost and low manufacturing yield of line sensors can be performed. In reading an original at a changed magnification, the problem of discontinuity in the image signals between line sensors is prevented, thereby allowing excellent image reading.

What is claimed is:

1. An original reader comprising:
   a plurality of line sensors each consisting of a plurality of photosensor elements, said line sensors being arranged such that lines read at a given instant by adjacent ones of said line sensors mutually differ;
   means for moving said plurality of line sensors and an original relative to each other in a direction perpendicular to a scanning direction of said plurality of line sensors at a speed corresponding to a variable reading magnification of the original; and
   means for delaying by a delay time an output from one of said line sensors which scans a line of the original prior to scanning of that line by a second one of said line sensors, said delay time being varied in accordance with the reading magnification of the original.

2. An original reader according to claim 1, wherein said delay means has means for storing the output from said one line sensor which scans the line of the original prior to scanning of that line by said second line sensor.

3. An original reader according to claim 1, further comprising conversion means for increasing or decreasing the number of pixels of the outputs from said plurality of line sensors in accordance with the reading magnification of the original.

4. An original reader according to claim 1, further comprising means for selecting on a time division basis an output from said delay means and an output from said second line sensor.

5. An original reader according to claim 1, wherein said delay means is a parallel register for parallel shifting an analog output which is extracted in parallel from each of said photosensor elements of said second line sensor.

6. An original reader according to claim 1, further comprising a substrate upon which said plurality of line sensors are provided.

7. An original reader according to claim 1, wherein said plurality of line sensors are arranged to read the same line of the original on a shared basis.

8. An original reader according to claim 1, further comprising means for controlling an operation of said delaying means in accordance with the reading magnification of the original.

9. An original reader according to claim 1, wherein said delaying means delays the output from said one line sensor, in the case of enlargement reading of the original, with a delay time which is longer than a delay time used in the case of non-enlargement reading, and, in the case of reduction reading of the original, with a delay time which is shorter than a delay time used in the case of non-reduction reading.

10. An original reader comprising:
    substrate means;
    a plurality of line sensors provided on said substrate means and each consisting of a plurality of photosensor elements, said plurality of line sensors being arranged such that lines read by adjacent ones of said line sensors at a given instant mutually differ;
    means for moving said plurality of line sensors and an original relative to each other in a direction perpendicular to a scanning direction of said plurality of line sensors at a speed corresponding to a variable reading magnification of the original;
    delay means provided on said substrate means for delaying an analog output of one of said line sensors which scans a particular line of the original prior to scanning of that line by another of said line sensors; and
    control means for controlling a delay time by which the analog output is delayed by said delay means in accordance with the reading magnification of the original.

11. An original reader according to claim 10, wherein said control means controls said delaying means so as to provide a longer delay time in the case of enlargement reading of the original than in the case of reduction reading of the original.

12. An original reader according to claim 10, wherein said delay means has means for storing the analog outputs from said one line sensor.

13. An original reader according to claim 10, further comprising conversion means for increasing or decreasing the number of pixels of the outputs from said plurality of line sensors in accordance with the reading magnification of the original.

14. An original reader according to claim 10, further comprising means for selecting on a time division basis between an analog output from said delay means and an analog output from said other line sensor which scans later the same line of the original.

15. An original reader according to claim 10, wherein said delay means is a parallel register for parallel shifting an analog output which is extracted in parallel from each of said photosensor elements of said line sensors.

16. An original reader according to claim 10, wherein said substrate means comprises a single substrate on which said plurality of line sensors are provided.

17. An original reader according to claim 10, wherein said plurality of line sensors are arranged to read the same line of the original image on a shared basis.

* * * * *